(12) United States Patent
Elsey et al.

(10) Patent No.: US 8,195,684 B2
(45) Date of Patent: Jun. 5, 2012

(54) TECHNIQUE FOR EFFECTIVELY COLLECTING AND ANALYZING DATA IN PROVIDING INFORMATION ASSISTANCE SERVICES

(75) Inventors: Nicholas J. Elsey, West Linn, OR (US); Karen L. Johnson, Portland, OR (US); Timothy A. Timmins, Tigard, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 1154 days.

(21) Appl. No.: 10/899,188

(22) Filed: Jul. 26, 2004

(65) Prior Publication Data
US 2005/0004934 A1 Jan. 6, 2005

Related U.S. Application Data

(62) Division of application No. 10/051,998, filed on Jan. 17, 2002, now abandoned.

(51) Int. Cl.
*G06F 17/30* (2006.01)
*G06F 15/173* (2006.01)

(52) U.S. Cl. ......... 707/767; 707/768; 707/776; 707/780

(58) Field of Classification Search .................. 379/223; 707/768, 765, 767, 780, 776
See application file for complete search history.

(56) References Cited

U.S. PATENT DOCUMENTS

| | | | |
|---|---|---|---|
| 4,020,473 A * | 4/1977 | Fujimura | 1/1 |
| 4,104,717 A * | 8/1978 | Fujimura | 1/1 |
| 6,101,503 A * | 8/2000 | Cooper et al. | 707/104.1 |
| 6,122,361 A | 9/2000 | Gupta | |
| 6,144,958 A * | 11/2000 | Ortega et al. | 707/5 |
| 6,539,377 B1 | 3/2003 | Culliss | |
| 6,640,143 B1 | 10/2003 | Lee et al. | |
| 6,671,681 B1 * | 12/2003 | Emens et al. | 707/5 |
| 6,918,086 B2 * | 7/2005 | Rogson | 715/257 |
| 6,976,019 B2 * | 12/2005 | Davallou | 707/6 |
| 7,039,629 B1 * | 5/2006 | Theimer et al. | 1/1 |

OTHER PUBLICATIONS

Abrams, Basic Data Communication Network Terms, Feb. 1998, p. 1.*

* cited by examiner

*Primary Examiner* — Susan Chen
*Assistant Examiner* — Albert Phillips, III
(74) *Attorney, Agent, or Firm* — Sofer & Haroun, LLP

(57) ABSTRACT

In an information/call center where calls are received, requesting information concerning entities, goods and services, directions to a given destination, etc., data is collected in processing such calls. In accordance with the invention, the collected data is analyzed to generate dynamic data to supplement and/or improve the traditional databases, typically searched by an operator for responses to the information requests. In providing a public information assistance service, such dynamic data may concern, e.g., the most popular movies, restaurants, requested categories, etc. In providing a personalized information assistance service, such dynamic data may concern, e.g., previous telephone connections made for a subscriber, the most popular telephone connections requested by a subscriber, etc. In addition, based on the past search behavior, "fuzzy" logic is developed for correlating between search terms. When one search term is used in a search, the correlated search term may be suggested for adoption, in accordance with the fuzzy logic.

19 Claims, 7 Drawing Sheets

200

40

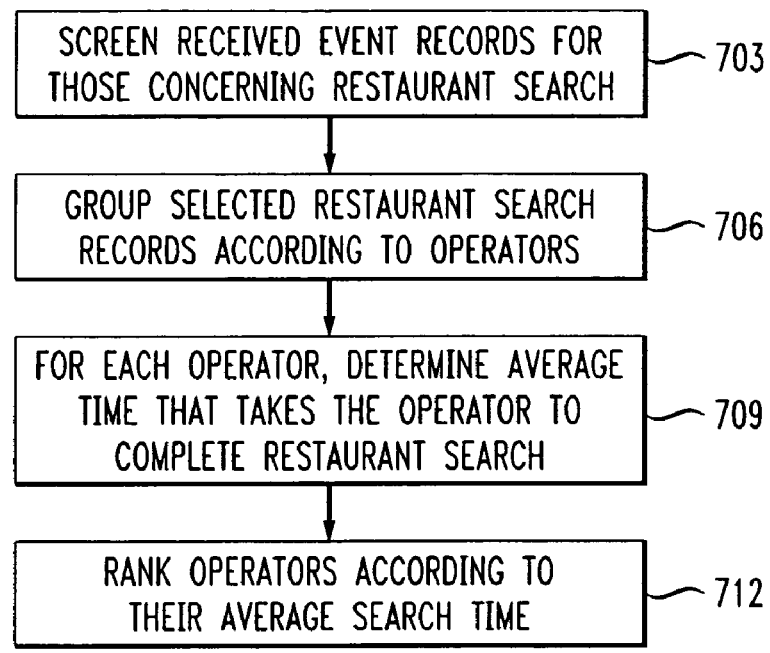

TECHNIQUE FOR EFFECTIVELY COLLECTING AND ANALYZING DATA IN PROVIDING INFORMATION ASSISTANCE SERVICES

The present application is a division of application Ser. No. 10/051,998 filed on Jan. 17, 2002 now abandoned.

FIELD OF THE INVENTION

The invention relates to a communications technique, and more particularly to a technique for collecting data in providing information assistance services, and analyzing the collected data to improve such services.

BACKGROUND OF THE INVENTION

It is a common experience to call a telephone operator for information assistance. In a typical information assistance call, a user identifies to the operator the name and address (or sometimes city or area code) of a party whose telephone number is desired. In response, the operator locates the desired destination number using, e.g., a computer database. The destination number may be provided to the customer, e.g., by automated voice, and the customer is afforded an option to be connected to the destination number without the need of first terminating the information assistance call.

Enhanced services may be provided to a user in an information assistance call. For example, upon request, an operator may also search certain databases to obtain for the user information concerning restaurants, movie listings, directions to given places, etc. These traditional databases typically provide such information as the titles of the movies being played, the names of the theaters playing a given movie, and the telephone number of a given theater, etc.

SUMMARY OF THE INVENTION

Although the traditional databases used in the aforementioned enhanced services provide useful information, they contain no annotative information which may be time sensitive. As a result, relying on such databases, an operator providing information assistance services is most likely unprepared to respond to such inquiries as "What movies seem to be popular tonight;" "What restaurants do New Yorkers frequent these days;" etc.

The invention overcomes the prior art limitations by generating dynamic information in processing information assistance calls to improve and/or supplement the traditional databases. Such dynamic information may result from analyzing the data associated with processing of the calls in accordance with the invention. For example, the dynamic information may include statistics as to the relative frequencies of accessing information concerning particular movies, which are indicative of the popularity of such movies. In addition, the statistics may be generated as a function of time, e.g., the time range within which the movie searches are conducted, and/or the geographic area, e.g., the area in which the inquired movie theaters are located. Such statistics may be frequently updated to provide timely information for responses to the above inquiries.

Thus, in accordance with the invention, after information assistance calls are received, a database is searched for the requested information. Data is generated in processing the calls, and information is derived from such data which may include, e.g., lists of popular movies and restaurants, and is used for responding to callers' inquiries in subsequent calls.

In accordance with an aspect of the invention, data is generated when assisted communication connections are established for a user through the service. Information is derived from the data, which concerns at least one of the connections, e.g., the last X connections or the Y most popular connections made by the user. Such information is provided to the user at a predetermined data location, e.g., a predetermined uniform resource locator (URL) on the Internet, which is accessible by the user.

In accordance with another aspect of the invention, data is generated from processing communication calls which involve a call activity, e.g., a database search. Information is derived from such data, which is used to evaluate the performance of the call activity, e.g., the average time that it takes an operator to complete a database search.

In accordance with yet another aspect of the invention, when a search is conducted using a first search criterion in response to an information assistance request, a second search criterion may replace the first search criterion in conducting the search pursuant to "fuzzy" logic. The fuzzy logic is developed based on a correlation between the first search criterion and the second search criterion, which is a function of the number of searches prior to the current search where use of the first search criterion is followed by use of the second search criterion, and where use of the second search criterion, but not the first search criterion, produces desired results.

BRIEF DESCRIPTION OF THE DRAWING

Further objects, features and advantages of the invention will become apparent from the following detailed description taken in conjunction with the accompanying drawing showing an illustrative embodiment of the invention, in which:

FIG. 7 is a flow chart depicting a routine for evaluating the performance of operators in an information/call center;

FIG. 8 illustrates a Login graphical user interface (GUI) for providing a personalized information assistance service;

DETAILED DESCRIPTION

The invention is directed to providing information assistance services in an information/call center environment. The traditional databases used in information assistance services provide such useful information as the name, address and/or telephone number of a desired party. However, they are deficient in that they contain no annotative information, which may be time sensitive. As a result, relying on such databases, an operator providing information assistance services is most likely unprepared to respond to such inquiries as "What movies seem to be popular tonight;" "What restaurants do New Yorkers frequent these days;" etc. It should be noted that the term "operator" used herein broadly encompasses entities that are capable of providing information assistance in a communication environment, including without limitation human operators, voice response/recognition capabilities, web- or WAP-enabled operator services, and other electronic access.

The invention overcomes the prior art limitations by generating dynamic information in processing information assistance calls to improve and/or supplement the traditional databases. Such dynamic information may result from analyzing the data associated with the call processing in accordance with the invention. For example, the dynamic information may include statistics as to the relative frequencies of accessing information concerning particular movies or other enhanced information, which are indicative of the popularity of such movies. In addition, the statistics may be generated as a function of time, e.g., the time range within which the movie searches are conducted, and/or the geographic area, e.g., the area in which the inquired movie theaters are located. Such statistics may be frequently updated to provide timely information for responding to such inquiries as "What movies seem to be popular tonight."

In addition, the invention not only applies to public information assistance services, which are provided to the general public, but also to personalized information assistance services described below, which are available to their subscribers.

Figure 1:
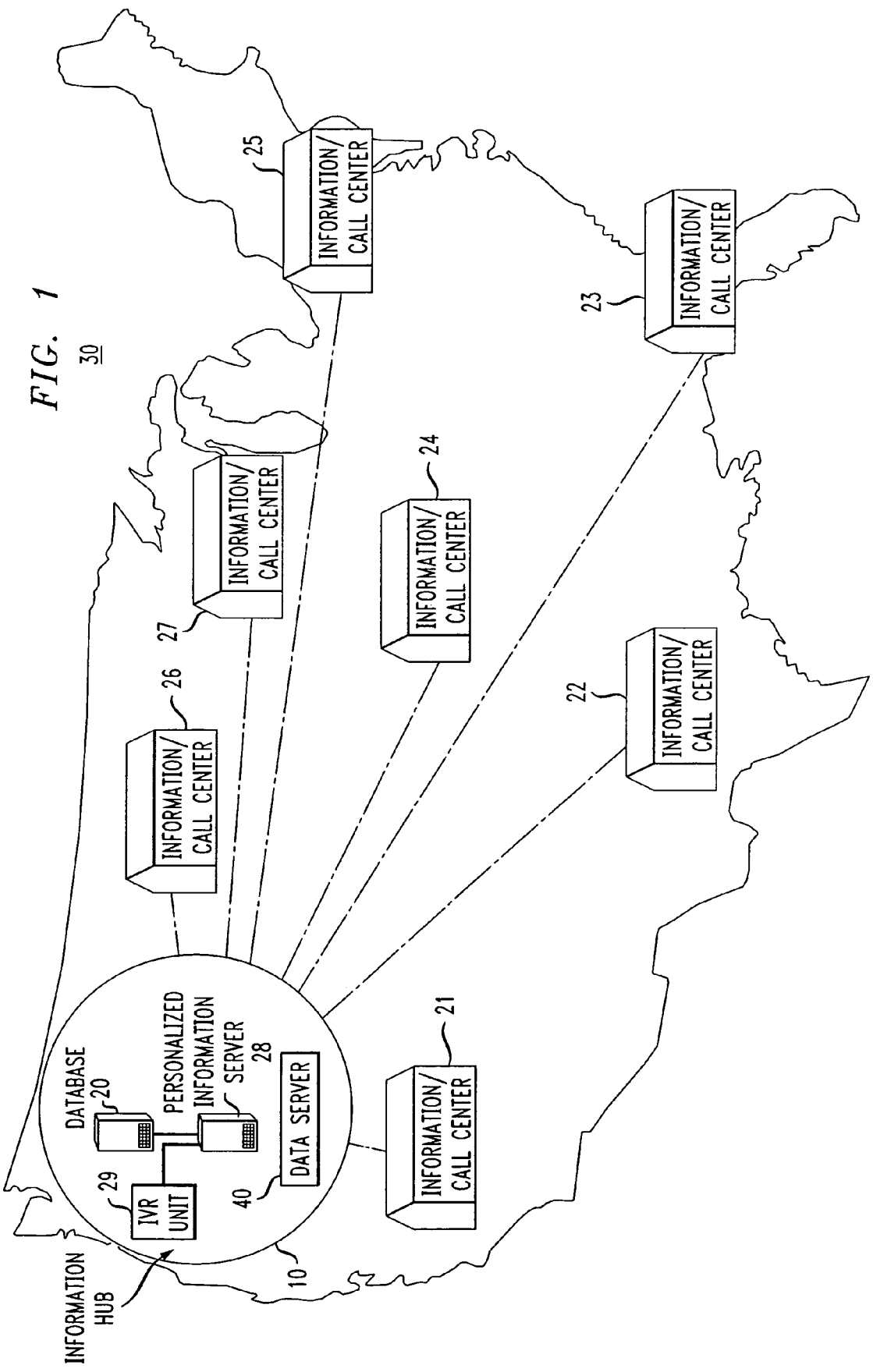
FIG. 1 illustrates a communications system including information/call centers in accordance with the invention.

FIG. 1 illustrates a system for providing both the personalized and public information assistance services in accordance with the invention. As shown in FIG. 1, the subject system includes wide area network (WAN) 30 covering an extensive area. WAN 30 can be an Internet-based network such as the World Wide Web or a private intranet based network. WAN 30 connects operators dispersed throughout a wide coverage area in information/call centers 21 through 27.

Figure 2A:
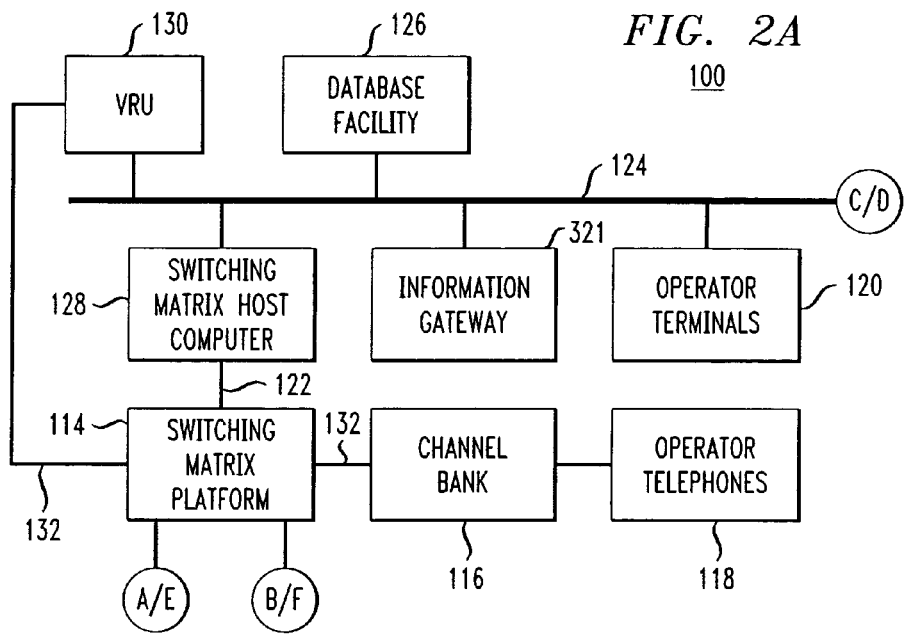
FIGS. 2A and 2B are block diagrams of components of the communications system of FIG. 1.
Figure 2B:
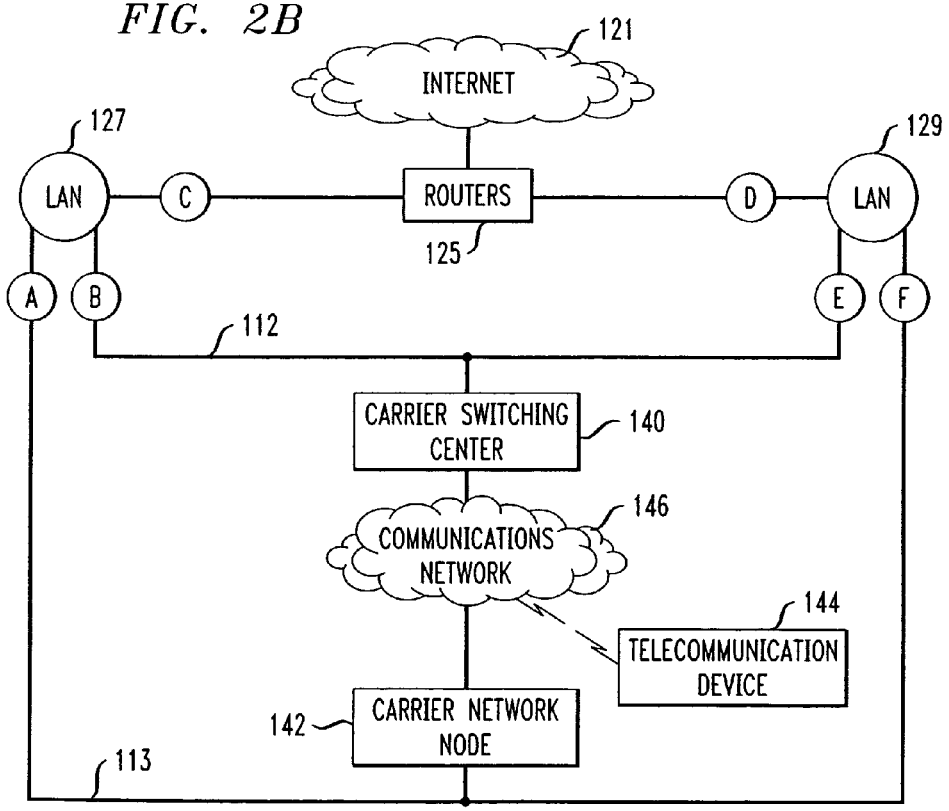

Each of information/call centers 21 through 27 covers one or more regional coverage areas. Referring to FIGS. 2A and 2B, information/call center 100 (which generically represents one of aforementioned information/call centers 21 through 27) is attended by operators, which includes switching matrix platform 114 connected to one or more external T1 voice connections 112. Switching matrix platform 114 is also connected via T1 communication links 132 to channel bank 116 for coupling to operator telephones 118.

Each operator is equipped with a terminal 120 that includes a monitor, mouse and keyboard with associated dialing pad. The operator terminals are coupled over data network 124 to database facility 126, allowing an operator to access data in database facility 126 through operator terminals 120. Database facility 126 contains, among others, public directory information.

Data network 124 further connects to information gateway 321, voice response unit (VRU) 130, and switching matrix host computer 128 (also known as a PBX host), which in turn is connected to switching matrix platform 114 by data link 122. Data network 124 includes, but is not limited to, local area network (LAN) 127, best seen in FIG. 2B. LAN 127 may connect to other similar remote LANs 129 to form WAN 30 in FIG. 1. LANs 127 and 129 are connected to one another and to Internet 121 via routers 125.

A user's telephone, computer, PDA or other telecommunication device 144 communicates via communications network 146 which is connected to carrier network node 142 and carrier switching center 140. T1 voice connections 112, or voice links, provide connection between the information/call center's switching matrix platform 114 and the carrier's switching center 140, through which incoming information assistance calls are received. T1 voice connections 112 further provide connection to the carrier network over which outgoing calls are placed (which network may be different than that used for incoming calls). Similarly, T1 data connections 113, or data links, provide a signaling connection between the information/call center's node (not shown) and carrier network node 142, through which incoming and outgoing signaling messages are transported. The information/call center node is contained within switching matrix platform 114, but one with skill in the art will appreciate that the information/call center node could also be a physically distinct component. If the outgoing call is being placed over a different network than that on which the incoming call was received, a second data connection to the outgoing network will be established.

The operation of switching matrix platform 114 is governed by computer-readable instructions stored and executed on switch matrix host computer 128. VRU 130 is connected via data network 124 to host computer 128 (to which it acts as a slave processor) and via one or more T1 spans to switching matrix platform 114. Each VRU 130 when more than one is employed in information/call center 100, connects to switching matrix platform 114 via a separate link. VRU 130 is employed to play the constantly repeated parts of an operator's speech, namely, the various greetings and signoffs (or closings), and the caller's desired telephone number where requested. At appropriate stages in a call progression, switch matrix host computer 128 initiates a voice path connection between VRU 130 and switching matrix platform 114 such that the user, or the user and the operator, are able to hear whatever pre-recorded speech is played on that connection by VRU 130. Computer 128 then instructs VRU 130, via data network 124, what type of message to play, and passes data parameters that enable VRU 130 to locate the message appropriate to the call state. VRU 130 may also contain a voice recognition system for receiving verbal input from a party connected to the VRU.

Database facility 126 enables the operator to provide additional assistance including searching by type of goods/services and/or geographic region, thereby providing a caller with information on restaurants, movie-listings, directions to various places, etc.

Users of a particular telephone carrier or company may dial, speak or otherwise communicate the access digits, access codes or retail numbers, or input an address or a URL established for information assistance by that company. The instant example assumes that the user dials, e.g., "411," "*555," "555-1212," "1-800-555-1212," "00," or other designated access numbers. The participating telephone company's own switching system will then reroute the call to information/call center 100 (via a T1 channel), where it appears as an incoming call.

Automatic call distribution (ACD) logic is used to queue (if necessary) and distribute calls to operators in the order in which they are received, and such that the call traffic is distributed evenly among the operators. In other embodiments, other distribution logic schemes are utilized, such as skills-based routing or a priority scheme for preferred callers. The queue is maintained by switching matrix host computer 128.

During an information assistance call, multiple events may occur which include, e.g., a destination number connection event, restaurant search event, movie inquiry event, directions inquiry event, etc. In this illustrative embodiment, a record is created to account for each event. For example, when a user calls for information assistance, and an operator is unavailable, the call is placed in queue by platform 114. At the same time, host computer 128 generates a first event record concerning the queuing event. When the call is ultimately connected to the operator by platform 114, host computer 128 then generates a second event record concerning the operator connection event. If the user asks the operator to search for a movie theater playing a given movie in a particular area, the operator utilizes database facility 126 to locate one such theater. Database facility 126 then generates a third event record concerning the movie search event, and a fourth event record concerning the search results including information about the located theater. Further, if the user asks to be connected to the destination number of the located theater, the operator initiates a call to the destination number through database facility 126, which then generates a fifth event record concerning the call initiation. Accordingly, platform 114 connects the current information assistance call to the destination number, and host computer 128 generates a sixth event record concerning the connection. If the connection results in ringing with no answer, VRU 130 presents to the user menu options for selection, and generates a seventh event record concerning the menu presentation. If for any reason the user utilizes a StarBack® service to be re-connected to an operator, platform 114 generates an eighth event record concerning the StarBack® event. As one can appreciate that as the information assistance call goes on, more and more events may occur and thus event records are generated during the call.

Figure 3:
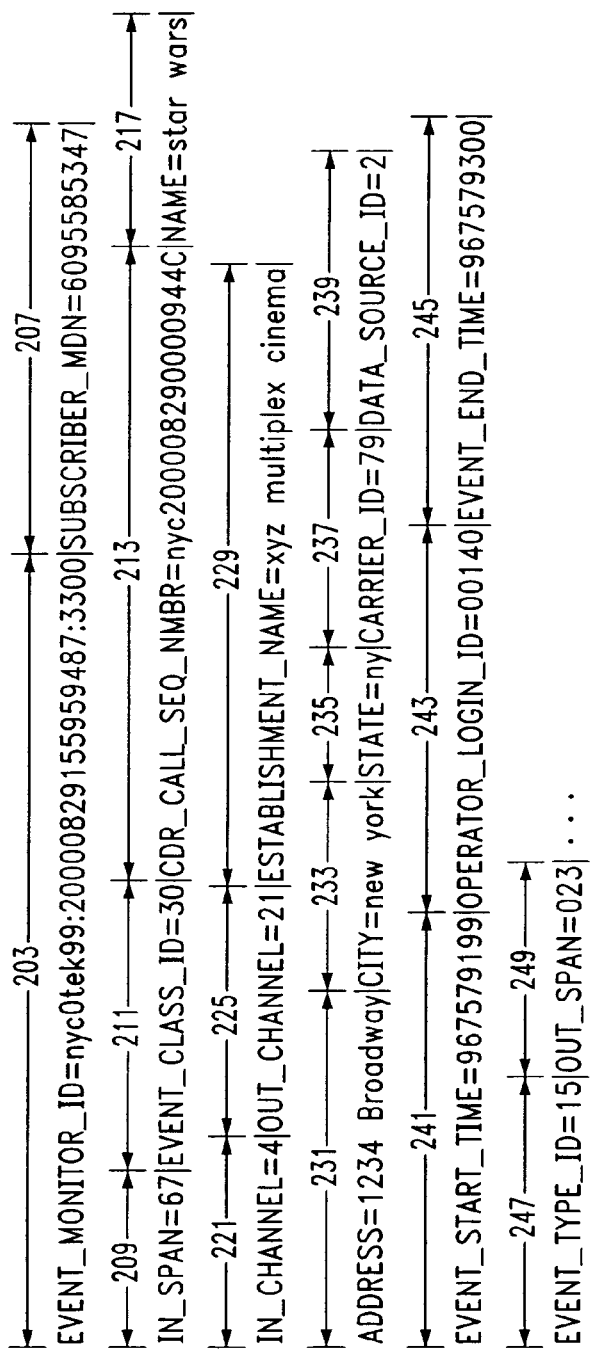
FIG. 3 illustrates a record of an event occurrence generated in an information/call center.

As discussed below, the generated event records are transmitted to information gateway 321 for further processing. In that regard, information gateway 321 acts as a server in relation to such clients as host computer 128, database facility 126 and VRU 130. FIG. 3 illustrates one such event record (denoted 200) which is generated by a client, e.g., database facility 126, during an information assistance call. As shown in FIG. 3, event record 200 includes multiple fields describing a search result event. Specifically, EVENT_MONITOR_ID field 203 contains a sequence of alphanumeric characters uniquely identifying event record 200. SUBSCRIBER_MDN field 207 identifies the telephone number of the user who made the information assistance call. IN_SPAN field 209 identifies the T1 span transporting the incoming communication of the information assistance call. In this illustrative embodiment, each event is identified by an event type within an event class. EVENT_CLASS_ID field 211 specifies one of the event classes to which the instant event belongs. For example, the value "30" in field 211 in this instance corresponds to a SEARCHES class. Other values for field 211 may correspond, e.g., to CALL PROCESSING, VALUE ADDED SERVICE and LOCAL SERVICES classes. EVENT_TYPE_ID field 247 specifies one of the event types within the class identified by the value in field 211. For example, the value "15" in field 247 in this instance corresponds to a movie search result event within the SEARCHES class. Similarly, other values for field 247 correspond to different types of event in an identified class.

CDR_CALL_SEQ_NMBR field 213 contains a sequence number identifying the information assistance call in question. It should be pointed out that event records concerning different events occurring in the same call share the same value in field 213. To that end, when the information assistance call is initially received by switching matrix platform 114, host computer 128 assigns a sequence number identifying the call. It then generates and transmits a network message to every other client connected to network 124, informing the client of use of the same sequence number to identify the current call.

It should be noted at this point that with the above server-client arrangement, the clients can be flexibly connected locally or remotely to contribute data or services in handling the current call or subscriber session. Further, knowing the call sequence number identifying the current call/session, each client generates events as it provides the data/services, without the need to be aware of prior actions by another client. The events are correlated after the fact to provide a complete activity record for the call/session whose data can be incorporated in a database. Thus, the advantage here is that clients can be added to the system, new events generated or existing events modified without the need to alter any other client in the system or the database.

Name field 217 contains a particular movie title, e.g., STAR WARS, for which the movie search was conducted. IN_CHANNEL field 221 identifies the channel (within the T1 span identified by field 209 previously described) which the incoming communication of the information assistance call traverses. OUT_CHANNEL field 225 identifies the channel (within the T1 span identified by field 249 described below) which the outgoing communication of the information assistance call traverses. ESTABLISHMENT_NAME field 229 contains the name of the movie theater, e.g., XYZ Multiplex Cinema, resulting from the movie search. ADDRESS field 231 contains the address of the movie theater. CITY field 233 contains the name of the city, e.g., New York, which the movie theater is in. STATE field 235 contains the name of the state which the movie theater is in. CARRIER_ID field 237 identifies the carrier used to connect the call. For example, the value "79" in field 237 identifies AT&T Corp. as the carrier in this instance. DATA_SOURCE_ID field 239 identifies the client which generates record 200. EVENT_START_TIME field 241 indicates the start time of the event in question. It should be noted that the value in field 241 corresponds to a UNIX "epoch" time, i.e., the number of seconds elapsed from Jan. 1, 1970. Similarly, EVENT_END_TIME field 245 indicates the end time of the event in question. Thus, with such event start and end times, the duration of the event in question can be determined. OPERATOR_LOGIN_ID field 243 identifies the operator handling the event. Field 247 is described previously. OUT_SPAN field 249 identifies the T1 span transporting the outgoing communication of the information assistance call.

Figure 4:
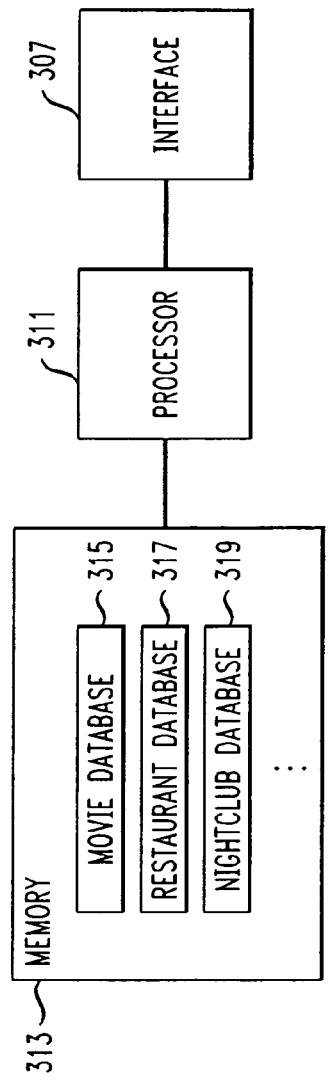
FIG. 4 is a block diagram of an information gateway for analyzing data in event records.

In this instance, each event record is further formatted by the client generating the record in packet form by adding a header to the record. Such a header includes the destination address of gateway 321 to which the packet is routed, and a destination type indicating what database in data server 40 in FIGS. 1 and 4 to which the event record pertains. For example, the instant destination type may indicate a movie database in server 40.

In a conventional manner, data network 124 routes event record packets to gateway 321 based on the gateway destination address therein. After receiving the event record packets, gateway 321 determines the destination type in the header of each received packet. In this example, the destination type indicates that the event record content of the packet pertains to a movie database in server 40, which is denoted 315 in memory 313. As such, gateway 321 in turn forwards the event record to server 40 through WAN 30. In accordance with an aspect of the invention, server 40 generates statistics of popular movies for selected periods and/or geographic areas, e.g., a list of popular movies within the last 12 hours in New York.

We have recognized a positive correlation between the popularity of a particular movie and the number of information assistance inquiries about the movie. That is, the higher the number of searches by an operator concerning a particular movie is in response to information assistance inquiries, the more popular the movie.

After receiving from gateway 321 the event record, say, event record 200, through interface 307, processor 311 in server 40 inspects the received record. Specifically, processor 311 checks fields 211 and 247 of the received record for the appropriate event class ID and event type ID, respectively, to verify the nature of the event, e.g., a movie search result event. Understanding that the received event record concerns movie search results, processor 311 stores the event record in particular movie data storage in database 315 for later analysis.

In this illustrative embodiment, database 315 also includes tables concerning different movie statistics. One such table may concern popular movies in the last 12 hours nationwide; another table may concern popular movies in the last week nationwide; yet another table may concern popular movies in the last 12 hours in a particular geographic area, etc. Each table contains movie records associated with different movies, respectively. For example, in a table, say, table A, which concerns popular movies in the last 12 hours nationwide, each movie record contains a count of search result events created for the associated movie over the last 12 hours. To that end, processor 311 from time to time updates table A. During each update, processor 311 selects from the movie data storage those movie search result event records having the event start time in field 241 within the last 12 hours, as indicated at step 503 in FIG. 5. Processor 311 at step 506 obtains from NAME field 217 of each selected event record a movie title. Processor 311 at step 509 determines whether in table A a movie record has been created for the movie title just obtained. If it is determined that such a movie record has been created, processor 311 at step 512 increases the count in the movie record by one. Otherwise, if it is determined that the movie record has not been created in table A, processor 311 at step 515 creates a record containing the movie title, and sets the count in the record to one.

Figure 6:
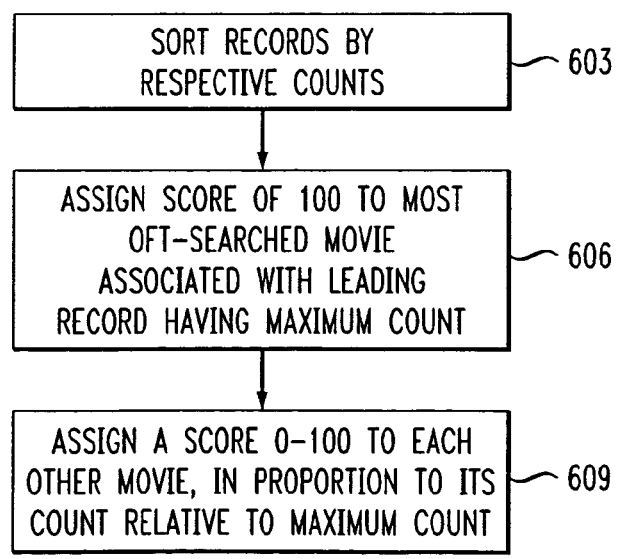
FIG. 6 is a flow chart depicting a routine for generating a popular movie list.

To generate a list of popular movies within last 12 hours nationwide, processor 311 sorts the movie records in table A by their respective counts, from the highest to the lowest, as indicated at step 603 in FIG. 6. Processor 311 at step 606 assigns a score of 100 to the most oft-searched movie associated with the leading record having the maximum count. At step 609 processor 311 assigns a score of 0-100 to each other movie, in proportion to its count in the associated record relative to the maximum count. The movie titles in the sorted movie records and the respective scores constitute the popular movie list in question.

Figure 5:
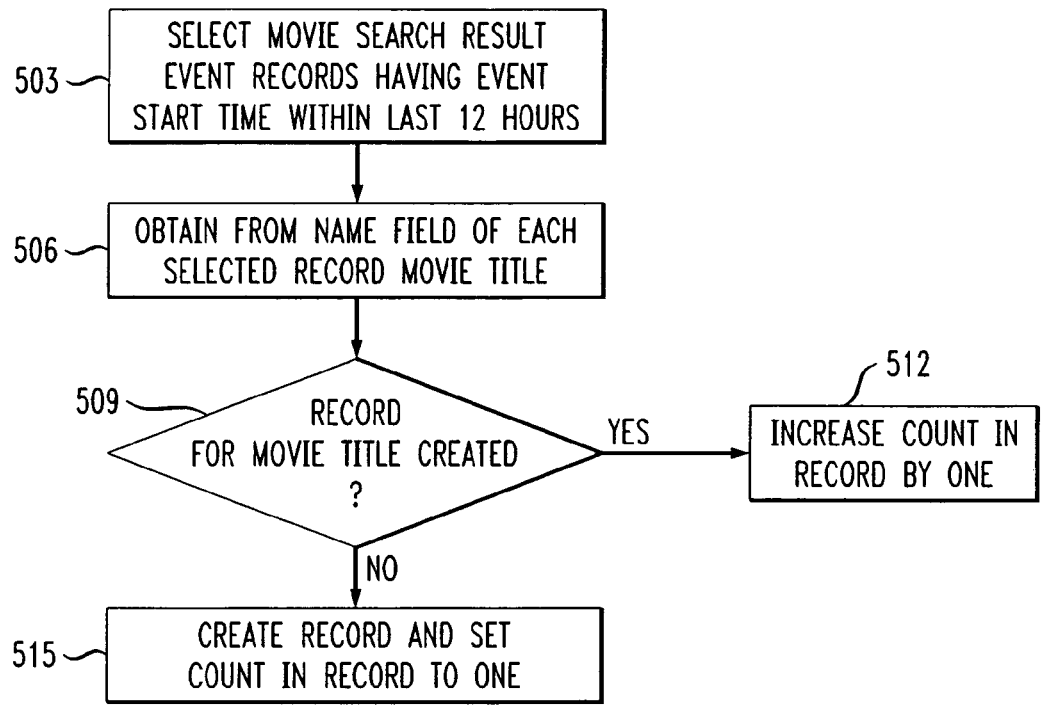
FIG. 5 is a flow chart depicting a routine for processing event record data.

Other popular movie lists are similarly generated, with modification to step 503 in FIG. 5. For instance, in generating a popular movie list for a different period, e.g., the last week, the event records selected at step 503 should satisfy such a period requirement. Furthermore, in generating a popular movie list for a given period and geographic area, the event records selected at step 503 should satisfy such period and geographic area requirements. The geographic area information associated with an event may be derived from CITY field 233 and STATE field 235 in the event record.

Each popular movie list, thus generated, is distributed by server 40 to gateway 321 (and the gateways of other information/call centers), which incorporates the ranking and score information from the list into the movie listing records in database facility 126 as separate fields, e.g., 12-hour national rank field, 12-hour national score field, etc. This being so, when an operator accesses facility 126 to conduct a search for a particular movie, the search results would include the movie's rank(s) and score(s) as field elements, along with such other field elements as the theater's name, address, etc. In addition, when an operator queries facility 126 for popular movies with certain criteria, the returned movie listings satisfying the criteria are sorted by rank. For example, to respond to the above inquiry "what movies seem to be popular tonight," an operator may query facility 126 for popular movies within the last 12 hours nationwide. The operator can then communicate to the user the movie titles, theater information, etc. from the returned movie listings which are presented in the order of their rank.

Similarly, based on the search result event records resulting from searches for an entity, e.g., a restaurant, nightclub, store, museum, plumbing service, travel service, etc., processor 311 generates the corresponding popular entity list for a given period and/or geographic area. It should be noted that where the length of the period used is relatively short, e.g., a month, the popular entity may only be topically popular. On the other hand, where the length of the period is relatively long, e.g., a year, the popular entity would be consistently popular. In addition, where the period coincides with a season, the popularity of an entity can be determined on a seasonal basis.

Server 40 maintains databases for selected types of entity, e.g., movie database 315 described above, restaurant database 317, nightclub database 319, etc. in memory 313. For instance, in generating a popular restaurant list with certain criteria, processor 311 selects those restaurant search event result records satisfying such criteria from storage in database 317. Processor 311 then processes the selected records in a similar manner to steps 506, 509, 512 and 515 in FIG. 5 (except in the context of restaurant names—as opposed to movie titles—derived from the ESTABLISHMENT_NAME field), resulting in the corresponding restaurant records containing their respective counts of search events created for the associated restaurants. To generate the popular restaurant list, processor 311 performs a process similar to that of FIG. 6, resulting in the ranked restaurant records containing the respective restaurant names and scores, which constitute the popular restaurant list in question.

It should be noted that different dimensions may be added to the popular restaurant list. For example, lists of popular restaurants specialized in particular cuisines may be generated based on the data in restaurant database 317 and another database associating restaurants with their cuisine specialties.

In addition, based on city and state information in fields 231 and 235 of the restaurant search result event records, a regional favorite restaurant list may be generated. For example, to generate a New York favorite restaurant list, processor 311 screens the restaurant search result event records for those records having (CITY, STATE)=(New York, N.Y.). The selected records are then processed in a similar manner to creating the popular restaurant list described above. With the appropriate New York popular restaurant information incorporated in database facility 126, an operator can readily respond to such inquiries as "What restaurants do New Yorkers frequent these days."

It should be noted at this juncture that processor 311 can be programmed to perform numerous analyses, limited only by the types of information received in the event records. For example, with information provided by EVENT_CLASS_ID field 211 and EVENT_TYPE_ID field 247 in the received event records indicating a particular call activity, processor 311 may be programmed to generate statistics concerning the number of information assistance calls handled over a predetermined period which involve the particular call activity. One such call activity may include a search for listings in a particular category, e.g., a search for listings in the restaurant category, movie category, plumbing category, etc. In that case, by applying the processes similar to those of FIGS. 5 and 6 to the appropriate event records, processor 311 generates a popular search category list.

In another embodiment, a directions client (not shown) is connected to data network 124, which provides travel directions, e.g., turn-by-turn directions, in response to a directions request containing an origination, a desired destination and/or other information. In some cases, the origination information may be provided directly from the user's communication device. In any event, the directions client generates a directions event record containing, among others, the origination and destination information each time when a request for travel directions from the origination to the destination is fulfilled. Based on such directions event records, processor 311 similarly generates a popular origination-destination list which may benefit travelers and, in particular, tourists. Having access to such popular origination-destination information, the operator may readily suggest to a user popular destinations given an origination by the user.

In yet another embodiment, a search event record contains data identifying one of the databases which was searched. In that embodiment, processor 311 is programed to generate a popular database list. By applying the processes similar to those of FIGS. 5 and 6 to the records of search events within a predetermined period in which identifiable databases were searched, processor 311 generates a popular database list.

In still yet another embodiment, processor 311 is programed to generate statistics which help maintain service quality control of information/call center 100. For example, to determine the efficiency of the operators at center 100 in providing a particular service, e.g., a restaurant search, processor 311 at step 703 in FIG. 7 screens the received event records for those concerning a restaurant search. Processor 311 at step 706 groups the selected restaurant search records according to the operators at center 100, who performed the searches and are identified by the value in OPERATOR_LOGIN_ID field 243 in the records. For each operator, processor 311 at step 709 determines, based on the event start time and end time information in the records associated with the operator, the average time that it takes the operator to complete a restaurant search over a predetermined number of searches. Processor 311 at step 712 ranks the operators according to their average search time, with the operator having the shortest average time ranked first. Based on such ranking, incentives may be afforded to the relatively efficient operators while additional training may be required of the relatively inefficient operators.

In another embodiment, the average times required by the operators in information/call center 100 performing different services are determined (e.g., from step 709 where the service is a restaurant search) and analyzed. Based on such an analysis, information/call center management can effectively adjust the required staffing levels and operator skills. For example, the analysis may show a trend that the percentage of operator call processing time for restaurant searches grows from 5% to 10% on Fridays. In that case, the management accordingly increases the number of operators on duty who are proficient in restaurant searches each Friday.

Referring back to FIG. 1, one or more information hubs 10 for providing a personalized information assistance service to subscribers are also included in WAN 30. An information hub 10 includes one or more personalized information servers 28, which are accessible by the operators in the system, and one or more databases 20 in which subscribers' information, e.g., subscribers' contacts information (also known as "private directories"), is stored and maintained. Such information may also be stored locally at one or more of the information/call centers.

It should be noted at this juncture that although the ensuing discussion illustratively focuses on subscribers' contacts information, which is organized in contacts folders, it similarly applies to other subscribers' information, e.g., appointments, to-do lists, notes, email, events, products and other information which may be tailored to the needs of an individual, or a group, e.g., a corporation, an organization, or a collection of people having a common interest. Thus, in this illustrative embodiment, the contacts folders contain contacts information pertaining to an individual or a group. For instance, an individual may want to create multiple contacts folders for different purposes. Such contacts folders may include a personal contacts folder containing personal contacts information, a business contacts folder containing business contacts information, and a softball group contacts folder containing contacts information which pertains to the softball league to which the individual belongs.

A group, e.g., a company, may take advantage of the personalized information assistance service by keeping contacts information of all of its employees in a contacts folder. Different levels of access may be set up for different employees.

With the personalized information service, a contacts folder may be created and maintained (1) directly through the Internet or other network or communications means, (2) indirectly through an operator, and/or (3) using a personal information manager (PIM). Well known PIMs include, e.g., handheld devices such as personal digital assistants (PDAs) and wireless communicators; and computer devices such as notebook, laptop and desktop computers running software applications such as Microsoft Outlook, Outlook Express, Goldmine, Symantec Act!, Lotus Organizer and Lotus Notes. Other PIMs may include proprietary PIM systems and applications. In case (3), by running a synchronization engine, the user may update any contacts data which has been changed (added, edited or deleted) in a PIM data source in the corresponding contacts folder, and vice versa.

In case (2), the user accesses a contacts folder through communications with an operator at an information/call center via telecommunication media, e.g., wireless telephone, wireline telephone, voice over Internet protocol (VoIP), PDA, VPN, etc. The operator is provided with web browsing capabilities, telephone facilities as well as fully-featured operator user interface applications which facilitate the searching, retrieval and administering of database 20 through server 28.

Without loss of generality, the user in this instance wants to access a contacts folder through an operator. To that end, the user uses telecommunication device 144, e.g., a wireless telephone, to call an operator at a designated access number. Let's say the call is routed to information/call center 100 where an operator attends to the call. After the user communicates to the operator his/her needs, the operator at terminal 120 accesses personalized information server 28 through WAN 30 (or alternatively Internet 121). In response, server 28 presents on terminal 120 a Login graphical user interface (GUI) which is opened by a browser running on terminal 120. FIG. 8 illustrates such a Login GUI, where the operator is prompted to enter the user's phone number or username to identify the user, and a password to verify that the user is authorized to access the personalized information service. It will be appreciated that other user information, e.g., a personal identification number (PIN), his/her mother's maiden name, etc. may be used for verification purposes as well.

It should be noted at this point that the user identification and password are established beforehand through a registration process. For example, to join the personalized information service, the user can call an operator at the designated access number. As part of the registration, the operator enters at a user data web page on server 28 the user information including username, password, etc. The user data web page in this instance is identified by a telephone number of the particular telecommunication device, e.g., wireless phone, which the user would normally use to call the service. It is particularly advantageous to use such a telephone number (also known as a mobile directory number (MDN) in the case of a wireless phone number) to identify the user data web page since the calling number would be automatically captured at information/call center 100 when the user calls. Specifically, platform 114 in center 100 in a well known manner derives, from the call set-up signals associated with the user's call, the user's phone number from which the call originates, also known as the automatic number identification (ANI).

Figures 9, 10:
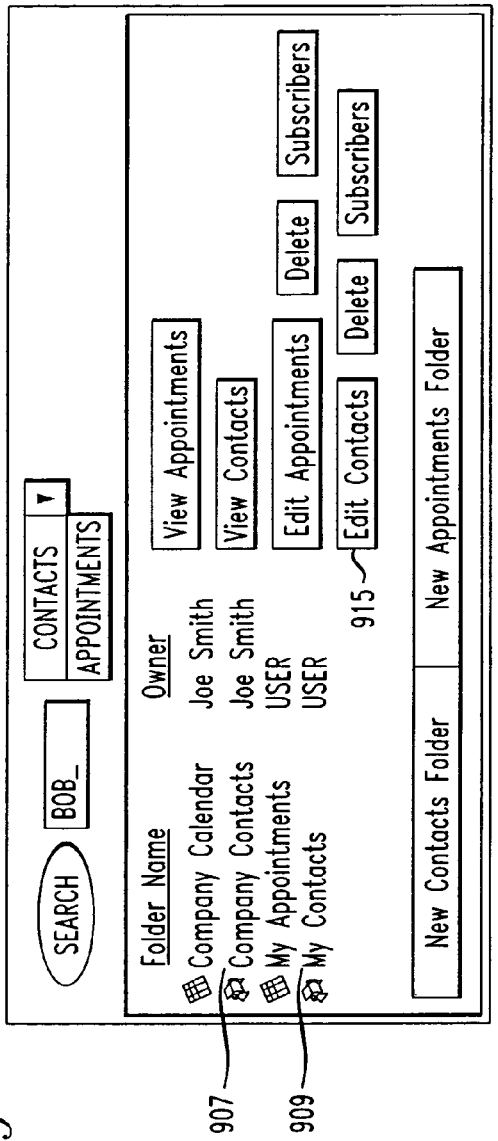
FIG. 9 illustrates a Home GUI.
FIG. 10 illustrates an Edit GUI.

Thus, referring to FIG. 8, the ANI of the user is automatically provided in entry 801 by platform 114, thereby obviating the need of the operator's eliciting from the user, and entering, the required phone number or username. (In the event that such an ANI is not automatically available or where the user is accessing the subject service from an unknown point, the user may supply via voice or other input, with or without prompting, the necessary identifying information.) At entry 804, the operator enters the password provided by the user to complete the login process. The login information is then transmitted to server 28, where it checks the aforementioned user data web page to verify the received ANI and password. After they are verified, server 28 identifies from the user data web page all of the folders including appointments folders associated with the received ANI, and any user's access rights thereto. Server 28 then presents to terminal 120 a Home GUI, listing all such folders. FIG. 9 illustrates the Home GUI, which lists, among others, contacts folders 907 and 909 designated "Company Contacts" and "My Contacts," respectively. The operator can then access the desired contacts folder, and manage the contacts data in the desired folder for the user, subject to the user's access rights. The operator may also direct the call to interactive voice response (IVR) unit 29 connected to server 28 in FIG. 1 to allow the user to hear selected contacts information.

By way of example, instructed by the user, the operator in this instance selects option 915 to edit/view contacts information in folder 909. In response, server 28 presents on terminal 120 an Edit GUI, listing the contacts information in folder 909. This GUI is illustrated in FIG. 10, where for each contact, e.g., Bob, his/her name, home phone number, business phone number and mobile phone number, if any, are displayed, although additional information concerning the contact, e.g., his/her postal and electronic mail addresses, may be available but is not displayed for lack of room. For that reason, a More option is provided for selection to present the additional information on a separate display. In addition, for each contact an Edit option is provided to edit the contact information.

Continuing the above example, the user in this instance requests the operator to connect him/her to Bob at home. To that end, the operator at terminal 120 selects Bob's home telephone number 1005, and signals switching matrix platform 114 through computer 128 to connect the user's call to the selected number 1005. Computer 128 receives from the browser on terminal 120 not only telephone number 1005, but also information concerning the listed name (e.g., Bob) and communication method (e.g., home telephone communication) associated with telephone number 1005. Computer 128 causes platform 114 to establish an outgoing connection with the communications device associated with telephone number 1005, and bridge the user's already established incoming connection to the outgoing connection, thereby connecting the user to telephone number 1005. Computer 128 then generates a record of the assisted call connection event having a format similar to that of record 200. The record is transmitted to gateway 321 in the form of a packet, with a header indicating that the record pertains to the personalized information database, e.g., database 20.

Figure 11:
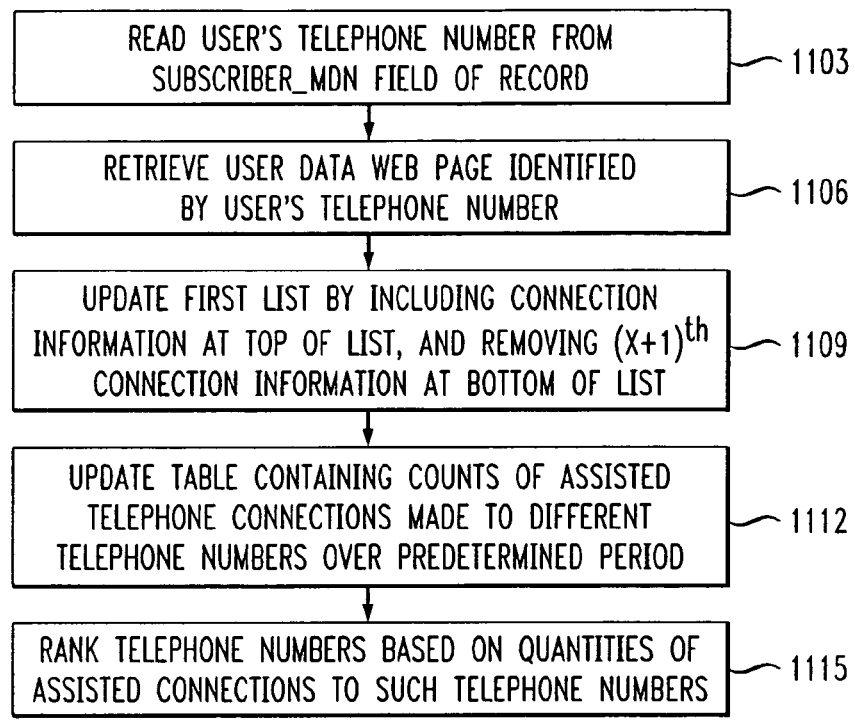
FIG. 11 is a flow chart depicting a routine for generating statistics concerning user communications.

In this instance, as part of the personalized information assistance service, the user is provided with a first list tracking the last X connections made by the user, where X represents a predetermined number. In addition, the user is provided with a second list tracking the Y most popular connections made by the user over a predetermined period, where Y represents a predetermined number. To generate and maintain such lists, after reviewing the header information in the aforementioned event record, processor 311 in gateway 321 reads the user's telephone number from SUBSCRIBER_MDN field 207 of the record, as indicated at step 1103 in FIG. 11. Processor 311 at step 1106 retrieves from server 28 the user data web page identified by the user's telephone number. Processor 311 at step 1109 updates the aforementioned first list (or generates if it does not exist) by including the connection information (e.g., the contact name Bob, home telephone communication method and telephone number 1005) in the record at the top of the list, and removing the (X+1)th connection information at the bottom of the list. At step 1112, processor 311 updates a table containing the counts of assisted telephone connections made to different telephone numbers over the predetermined period. The table also contains the times at which the assisted telephone connections were made, and the associated connection information. In this instance, processor 311 increases the count of the assisted telephone connection to Bob's home telephone number 1005 by one. In addition, processor 311 discounts those assisted connections which become stale, i.e., outside the predetermined period. Processor 311 at step 1115 ranks the telephone numbers based on the quantities of assisted connections to such telephone numbers, resulting in the aforementioned second list of Y most popular connections.

Processor at step 1118 provides the first and second lists on the user's data web page which are accessible by the user, e.g., at a predetermined uniform resource locator (URL) on the Internet.

It should be noted that although in the above illustrative embodiment, the lists of last X connections and Y most popular connections are derived from the contact folders associated with a user, the invention broadly encompasses the concept of keeping track for the user of connection information not only from such contact folders, but also any public directories, e.g., electronic white pages. Thus, in accordance with the invention, the above last X connection list may include connections made after an operator's consulting the contact folders and/or public directories. The above Y most popular connection list may also include connections made after an operator's consulting the contact folders and/or public directories.

Searches Aided by Fuzzy Logic

Figure 12:
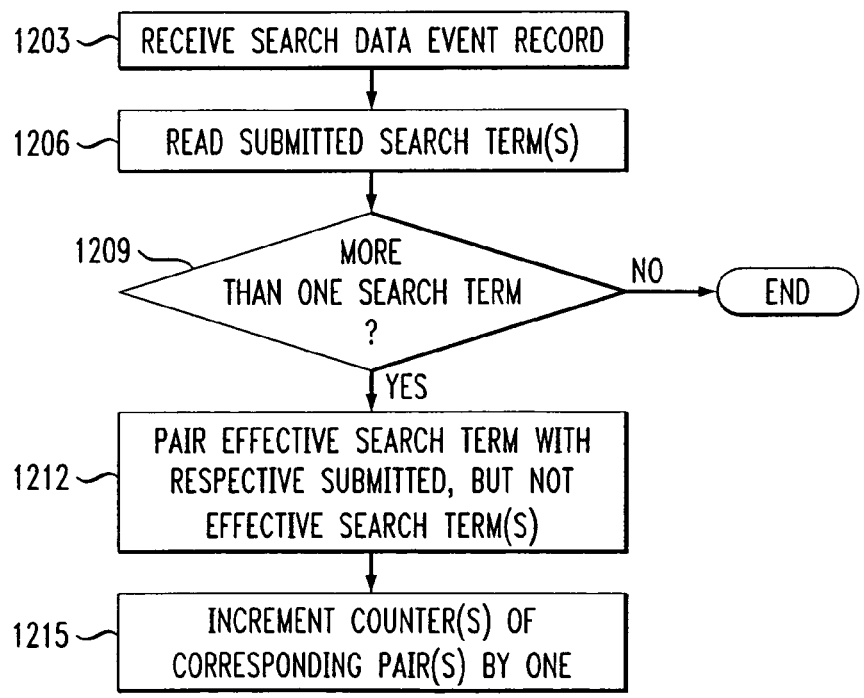
FIG. 12 is a flow chart depicting a routine for developing fuzzy logic to relate search terms.

In accordance with another aspect of the invention, processor 311 learns from searches performed by the operators at center 100, and develops "fuzzy" logic to aid the operators to streamline the searches. By keeping track of the initial search criteria submitted (e.g., "Seers Roebuck") to database facility 126 and the actual search term used (e.g., "Sears Roebuck") to obtain the desired search results, processor 311 develops over time the fuzzy logic correlating the submitted search term ("Seers Roebuck") and the effective search term ("Sears Roebuck"). Specifically, database facility 126 records keystrokes by an operator conducting a search using database facility 126. The recorded key strokes are transmitted to gateway 321 as part of a search data event record for each successful search. After processor 311 receives one such search data event record, as indicated at step 1203 in FIG. 12, processor 311 at step 1206 reads the search term(s) (e.g., "Seers Roebuck", "Seer Roebucks", and "Sears Roebuck") submitted during the search from the received record. In this instance, the search terms appear in a sequence in the record, and the one appearing last in the sequence is the effective search term, for which facility 126 provides the desired listing. Processor 311 at step 1209 determines whether the received record contains more than one search term. If it is negative, the subject routine comes to an end. Otherwise, the routine proceeds to step 1212 where processor 311 pairs the effective search term ("Sears Roebuck") with the respective submitted, but not effective, search term(s) ("Seers Roebuck," "Seer Roebucks"). For each pair, processor 311 maintains a counter for keeping track of the number of its occurrences. At step 1215, processor 311 increments the counter(s) of the corresponding pair(s) by one. When one such counter reaches a predetermined value, indicating frequent mistaking by operators of one search term for the other search term in a pair, processor 311 incorporates the fuzzy logic into database facility 126, correlating between the effective search term and its mistaken counterpart. As a result, on detecting an entry of one such mistaken counterpart in a search, database facility 126 automatically suggests the effective search term for adoption in the search, or replaces it with the effective search term.

The foregoing merely illustrates the principles of the invention. It will thus be appreciated that those skilled in the art will be able to devise numerous other arrangements which embody the principles of the invention and are thus within its spirit and scope.

For example, information/call center 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A system for providing an information assistance service comprising:
   a communication interface for receiving communications requesting a contact listing information; and
   a search facility for handling said communications requesting a search and conducting a search said search including the entering of at least a plurality of search criterion including at least a first search criterion corresponding to said requested contact listing in response to the request, wherein said first search criterion does not retrieve said requested contact listing, and entering a second effective search criterion corresponding to said requested contact listing, wherein said second effective search criterion retrieves said requested contact listing, said search facility configured to generate a search data event record for each search that results in retrieval of said requested contact listing;
   a processor at said search facility configured to review said search data event records and, for each search data, event record that includes more than one search criterion, generate a correlation between said first search criterion and said effective second search criterion, stored as a pair in relation to said contact listing;
   said processor further configured to track the number of occurrences of conducting a search that includes said pair of said first search criterion and said second effective search criterion, and after a predetermined number of occurrences of said pair, said correlation pair is incorporated into a database for future searches to automatically suggest said second effective search criterion when said first search criterion is entered.

2. The system of claim 1 wherein the request is communicated in a communication call.

3. The system of claim 1 wherein the communication is initiated from a mobile device.

4. The system of claim 3 wherein the mobile device includes a wireless telephone.

5. The system of claim 3 wherein the mobile device includes a PIM.

6. The system of claim 1 comprising a call center.

7. The system of claim 1 wherein the communication interface includes a switching facility.

8. The system of claim 1 wherein the first search criterion includes a first search term, and the second search criterion includes a second search term.

9. The system of claim 1 further comprising one or more devices that generate data concerning the searches.

10. The system of claim 9 wherein the data includes the first search criterion and the second search criterion.

11. The system of claim 9 wherein the one or more devices include the search facility.

12. A method for providing an information assistance service comprising:
   receiving a request for a contact listing information;
   conducting a search for said contact listing information including using at least a plurality of search criteria;
   among said plurality of search criteria, using a first search criterion corresponding to said requested contact listing in response to the request said first search criterion does not retrieve said requested contact listing;
   among said plurality of search criteria, using a second effective search criterion corresponding to said requested contact listing, said second search criterion retrieving said requested contact listing;
   generating a search data event record for each search that results in retrieval of said requested contact listing;
   reviewing, using a processor, said search data event records and generating a correlation between said first criterion and said second effective criterion stored as a pair in relation to said contact listing; and
   tracking by said processor the number of occurrences of conducting a search that includes said pair of said first search criterion and said second effective search criterion, and after a predetermined number of occurrences of said pair, said correlation pair is incorporated into a database for future searches to automatically suggest said second effective search criterion when said first search criterion is entered.

13. The method of claim 12 wherein the request is communicated in a communication, call.

14. The method of claim 12 wherein the communication is initiated from a mobile device.

15. The method of claim 14 wherein the mobile device includes a wireless telephone.

16. The method of claim 14 wherein the mobile device includes a PIM.

17. The method of claim 12 wherein the first search criterion includes a first search term, and the second search criterion includes a second search term.

18. The method of claim 12 further comprising generating data concerning the searches.

19. The method of claim 18 wherein the data includes the first search criterion and the second search criterion.

* * * * *